US012588791B2

(12) United States Patent
Linqvist et al.

(10) Patent No.: US 12,588,791 B2
(45) Date of Patent: Mar. 31, 2026

(54) DUST EXTRACTOR HAVING AN ELECTRIC OUTLET CONNECTABLE TO A POWER TOOL

(71) Applicant: Mirka Ltd, Jepua (FI)

(72) Inventors: Tommy Linqvist, Nykarleby (FI);
Jan-Anders Westerlund, Jakobstad (FI)

(73) Assignee: Mirka Ltd, Jepua (FI)

( * ) Notice: Subject to any disclaimer, the term of this patent is extended or adjusted under 35 U.S.C. 154(b) by 0 days.

(21) Appl. No.: 18/840,753

(22) PCT Filed: Feb. 16, 2023

(86) PCT No.: PCT/FI2023/050095
§ 371 (c)(1),
(2) Date: Aug. 22, 2024

(87) PCT Pub. No.: WO2023/161558
PCT Pub. Date: Aug. 31, 2023

(65) Prior Publication Data
US 2025/0176775 A1     Jun. 5, 2025

(30) Foreign Application Priority Data
Feb. 25, 2022     (FI) ...................................... 20225174

(51) Int. Cl.
A47L 9/28          (2006.01)
A47L 7/00          (2006.01)
B23Q 11/00        (2006.01)
(52) U.S. Cl.
CPC ........... *A47L 9/2805* (2013.01); *A47L 7/0095* (2013.01); *A47L 9/2842* (2013.01); *B23Q 11/0046* (2013.01)

(58) Field of Classification Search
None
See application file for complete search history.

(56)                 References Cited

U.S. PATENT DOCUMENTS

2010/0154161 A1     6/2010  Takahashi et al.
2019/0030669 A1*    1/2019  Wu .................... B23Q 11/0046
(Continued)

FOREIGN PATENT DOCUMENTS

EP          2433543 A2      3/2012
EP          3009058 A1      4/2016
(Continued)

OTHER PUBLICATIONS

International Search Report and Written Opinion in PCT/FI2023/050095, mailed May 12, 2023, 12 pages.
(Continued)

*Primary Examiner* — Kaj K Olsen
*Assistant Examiner* — Pradhuman Parihar
(74) *Attorney, Agent, or Firm* — ArentFox Schiff LLP

(57)                 ABSTRACT

A dust extractor having an autostart functionality that includes: a motor and a fan to generate an air flow; an electric outlet connectable to a power tool; a control system; a user interface; and a current measuring unit to measure electric current of the outlet, wherein the control system is arranged to: measure a first representative current value of the electric outlet, associate the first representative current value with a first state of the power tool based on a first user input received via the user interface, determine a first threshold value from the first representative current value associated with the first state of the power tool, measure the electric current of the outlet, compare the measured electric current with the threshold value, and control the suction air flow of the dust extractor based on a result of the comparison.

13 Claims, 7 Drawing Sheets

(56)          References Cited

U.S. PATENT DOCUMENTS

| | | |
|---|---|---|
| 2021/0100417 A1 | 4/2021 | Tauber et al. |
| 2021/0353121 A1 | 11/2021 | Schwille et al. |

FOREIGN PATENT DOCUMENTS

| | | | |
|---|---|---|---|
| JP | 4936226 | B2 | 5/2012 |
| WO | 2019/081118 | A1 | 5/2019 |
| WO | 2021096409 | A1 | 5/2021 |

OTHER PUBLICATIONS

European Search Report issued by the European Patent Office in European Patent Application No. 23759369.4, mailed Jan. 26, 2026.

* cited by examiner

Comparative Example

Comparative Example

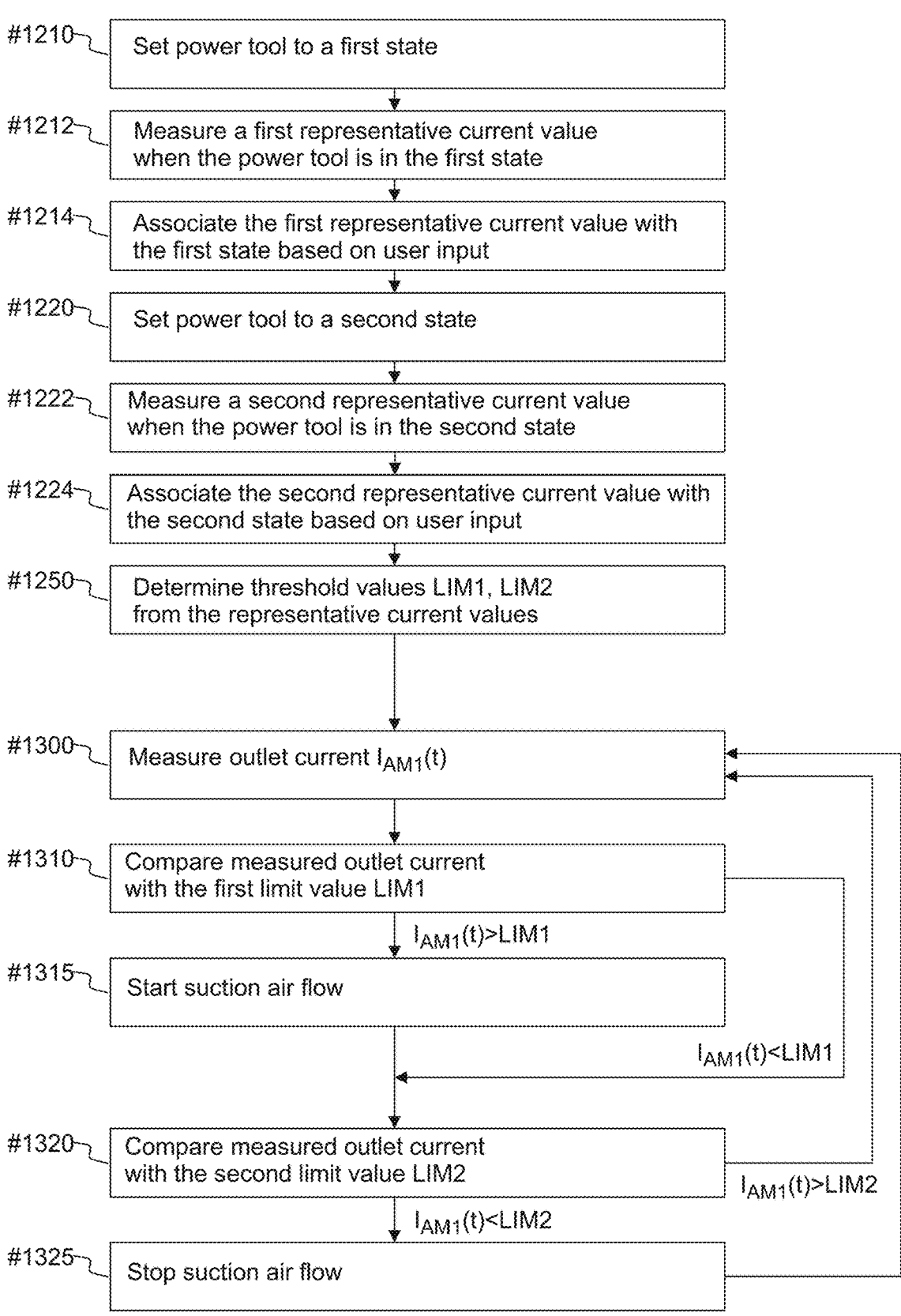

1210   Set power tool to a first state

1212   Measure a first representative current value when the power tool is in the first state

1214   Associate the first representative current value with the first state based on user input

1220   Set power tool to a second state

1222   Measure a second representative current value when the power tool is in the second state

1224   Associate the second representative current value with the second state based on user input

1250   Determine threshold values LIM1, LIM2 from the representative current values

1300   Measure outlet current $I_{AM1}(t)$

1310   Compare measured outlet current with the first limit value LIM1

$I_{AM1}(t) > LIM1$

1315   Start suction air flow $I_{AM1}(t) < LIM1$

1320   Compare measured outlet current with the second limit value LIM2

$I_{AM1}(t) > LIM2$ $I_{AM1}(t) < LIM2$

1325   Stop suction air flow

Fig. 3b

DUST EXTRACTOR HAVING AN ELECTRIC OUTLET CONNECTABLE TO A POWER TOOL

CROSS-REFERENCE TO RELATED APPLICATIONS

This application is a National Phase of PCT/FI2023/050095, filed on Feb. 16, 2023, which claims priority to Finnish Patent Application No. 20225174, filed on Feb. 25, 2022, the disclosures of each of which are hereby incorporated by reference in their entireties.

FIELD

Some embodiments relate to a dust extractor.

BACKGROUND

A power tool may generate dust particles during operation. The generated dust particles may be removed via a hose by using a dust extractor. The air flow of the dust extractor may be manually started before the power tool starts to generate dust particles, and the air flow of the dust extractor may be manually stopped after the power tool has stopped to generate dust particles.

It is known that the dust extractor may comprise an electric socket for providing electric power to the power tool. The dust extractor may measure the electric current drawn via the electric socket. The dust extractor may start the air flow when the measured electric current exceeds a predetermined threshold value, which has been previously set at a factory.

SUMMARY

An object of the invention is to provide a dust extractor device. An object of the invention is to provide an apparatus, which comprises a dust extractor device. An object of the invention is to provide a method for extracting dust. An object of the invention is to provide a method for processing a surface.

According to an aspect, there is provided a dust extractor (500), comprising:
- a motor (MOTOR1) and a fan (FAN1) to generate an air flow (AIR1),
- a dust separator (FIL1) to separate dust particles (DUST1) from the air flow (AIR1),
- an electric outlet (SOC1) connectable to a power tool (TOOL1),
- a control system (SYS1),
- a user interface (UIF1), and
- a current measuring unit (AM1) to measure electric current (IAM1) of the outlet (SOC1), wherein the control system (SYS1) is arranged to:
- measure a first representative current value (IR1) of the electric outlet (SOC1),
- associate the first representative current value (IR1) with a first state (STATE1) of the power tool (TOOL1) based on a first user input (INPUT1) received via the user interface (UIF1),
- determine a first threshold value (LIM1) from the first representative current value (IR1) associated with the first state (STATE1) of the power tool (TOOL1),
- measure the electric current (IAM1) of the outlet (SOC1),
- compare the measured the electric current (IAM1) with the threshold value (LIM1), and control an air flow (AIR1) of the dust extractor (500) based on a result of said comparison.

The scope of protection sought for various embodiments of the invention is set out by the independent claims. The embodiments, if any, described in this specification that do not fall under the scope of the independent claims are to be interpreted as examples useful for understanding various embodiments of the invention.

A power tool may be connected to an electric outlet of the dust extractor. The operation of the dust extractor may be controlled based on the electric current drawn from the electric outlet of the dust extractor. The suction air flow of the dust extractor may be started when the motor of the power tool starts to draw a significant current from the electric outlet. The suction air flow of the dust extractor may be stopped when the motor of the power tool is not running.

The dust extractor has an autostart functionality, which means that the air flow may be started when the measured electric current of the outlet increases to or exceeds a threshold value, and the air flow may be stopped when the electric current falls to or below a threshold value.

Controlling the suction air flow based on the measured outlet current may e.g. reduce energy consumption of the dust extractor, may increase operating lifetime of the dust extractor and/or may reduce average level of acoustic noise generated by the air flow.

The same dust extractor may be used with several different power tools, which may have different operating currents. A first power tool may draw a higher operating current from the electric outlet of the dust extractor, and a second power tool may draw a lower operating current from the outlet. An optimum threshold value for using the dust extractor with the first power tool may be quite high e.g. to minimize the risk of unintentional start of the air flow. However, the high threshold value determined for the first power tool may be too high for the second power tool, which draws the lower operating current. Using the high threshold value with the second power tool may cause unreliable operation. For example, the threshold value may be so high that the electric current of the second power tool is not sufficient to start the air flow when needed.

The present method may comprise determining an optimum threshold value for each different power tool, which is connected to the outlet of the dust extractor. The present method may ensure reliable auto start functionality with each different power tool.

The present method may comprise a learning stage and a usage stage. One or more tool-specific threshold values may be determined from measured outlet currents in the learning stage. The air flow of the dust extractor may be controlled based on the measured outlet current in the usage stage.

The power tool may have a first state where the motor of the power tool is rotating. The power tool may have a second state where the motor of the power tool is not rotating. The second state also be called e.g. as a standby state or as a power off state.

By way of example, the method may comprise:
- starting a learning stage e.g. by pressing a button of the interface of the dust extractor, or by connecting a power tool to the electric outlet of the dust extractor,
- displaying a prompt to press a button when the power tool is in a first state,
- setting the power tool to the first state,
- measuring a first representative current value associated with the first state by pressing the button when the power tool is in the first state, displaying a prompt to press a button when the power tool is in a second state, setting the power tool to the second state, measuring a second representative current value associated with the second state by pressing the button when the power tool is in the second state, determining one or more threshold values from the representative current values, starting a usage stage when the one or more threshold values have been determined, continuously or intermittently measuring electric current of the electric outlet, comparing the measured electric current with the one or more threshold values, and controlling the suction air flow of the dust extractor based on a result of the comparison.

The control system of the dust extractor may be configured to calculate the threshold values, so as to accommodate the dust extractor's electric outlet to the connected power tool.

The dust extractor may give the user a possibility to set the autostart ON/OFF levels based on the actual measured electric currents. Determining the threshold levels based on the measured currents may ensure proper operation of the auto start when using different power tools with the same dust extractor. Determining the threshold levels based on the measured currents may ensure proper operation of the auto start e.g. when using a first power tool, which draws a high current from the outlet, and also when using second different power tool, which draws a low current from the outlet.

BRIEF DESCRIPTION OF THE DRAWINGS

In the following examples, several variations will be described in more detail with reference to the appended drawings, in which FIG. 3*b* shows, by way of example, method steps for determining a threshold value for controlling operation of the dust extractor, and method steps for controlling operation of the dust extractor.

DETAILED DESCRIPTION

Figure 1A:
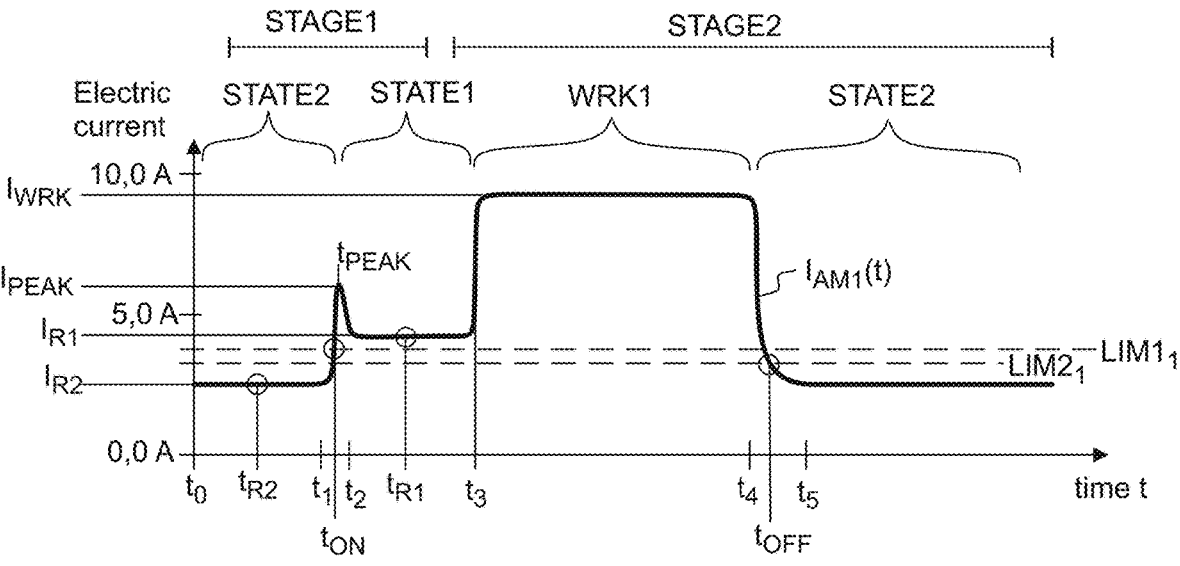
FIG. 1*a* shows, by way of example, temporal evolution of electric current of a first power tool.
Figure 4A:
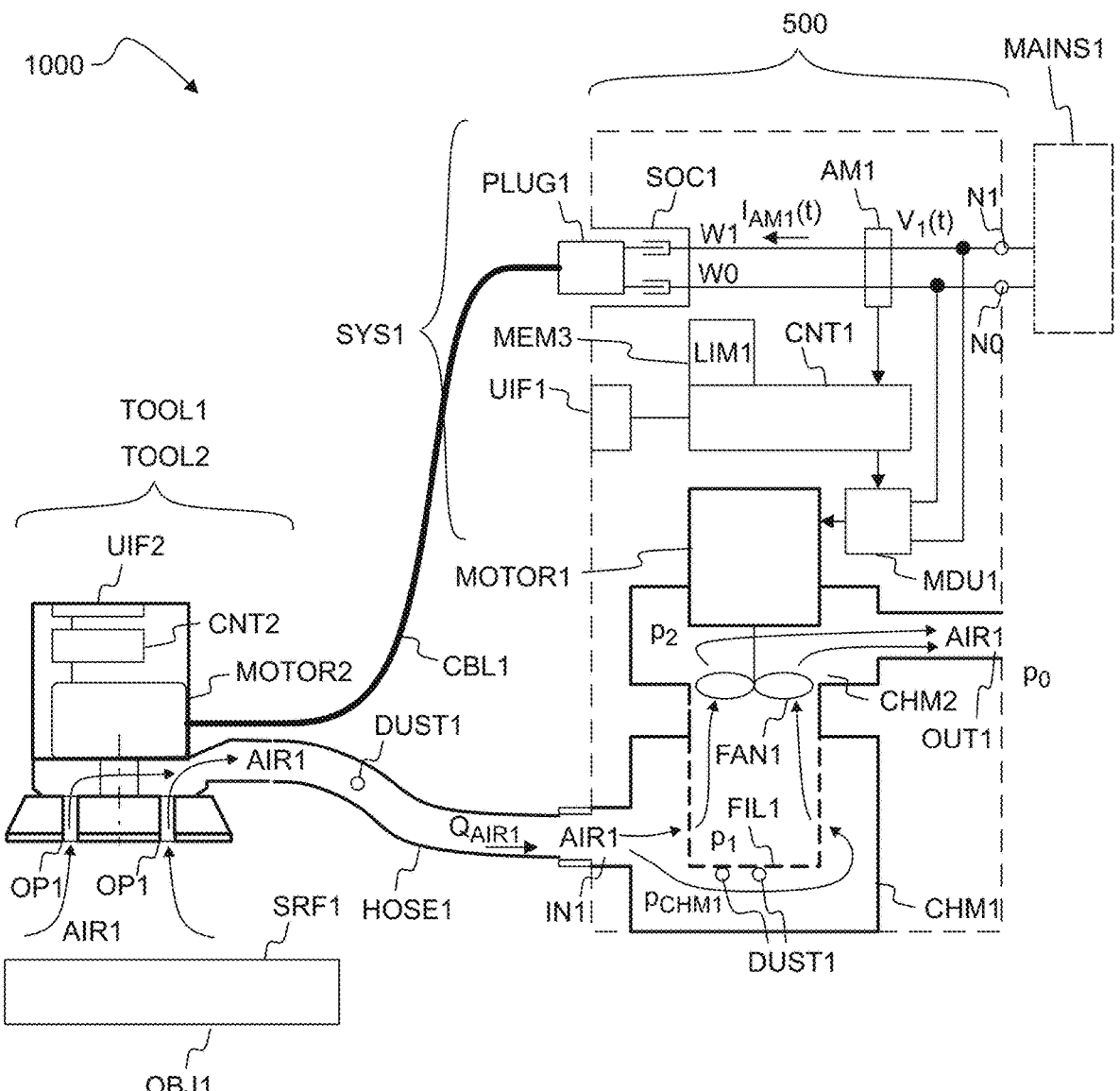
FIG. 4*a* shows, by way of example, a surface processing apparatus.

FIG. 1*a* shows, by way of example, temporal evolution of the measured electric current $I_{AM1}(t)$ transferred from the electric outlet SOC1 of the dust extractor 500 to a power tool TOOL1. The power tool TOOL1 may have a motor MOTOR2 e.g. as shown in FIG. 4*a*.

The power tool TOOL1 may have a first state STATE1, where the motor MOTOR2 of the power tool TOOL1 is running.

The power tool TOOL1 may be in a second state STATE2 from the time $t_0$ to the time $t_1$. The second state STATE2 may be e.g. a standby state or a power off state. The second state STATE2 may be e.g. a state where the motor of the power tool is not rotating. The power tool TOOL1 may have a second state STATE2, where the motor MOTOR2 of the power tool TOOL1 is not running.

Running of the motor MOTOR2 of the power tool TOOL1 may be started at a time $t_1$. The rotation speed of the motor MOTOR2 may be increased from the time $t_1$ to the time $t_2$. The change of the rotation speed of the motor MOTOR2 may cause a temporary peak $I_{PEAK}$ of the current at a time $t_{PEAK}$.

The power tool TOOL1 may be in a first state STATE1 from the time $t_2$ to the time $t_3$. The first state STATE1 may be e.g. a state where the motor of the power tool is rotating. The first state STATE1 may be e.g. a no-load running state. The motor MOTOR2 may run without a load during an idling time period from the time $t_2$ to the time $t_3$.

Processing of an object OBJ1 with the power tool TOOL1 may be started at a time $t_3$. The power tool TOOL1 may be used for processing an object OBJ1 during a working time period WRK1 from the time $t_3$ to the time $t_4$. The power tool TOOL1 may draw a current $I_{WRK}$ during the working time period WRK1, so as to provide mechanical power during the working time period WRK1.

Running of the motor MOTOR2 may be stopped at the time $t_4$. Rotation of the motor MOTOR2 may be stopped at the time $t_5$. The power tool TOOL1 may be in the second state STATE2 after the time $t_5$.

Operation in the first state STATE1 may involve generating dust particles DUST1 and/or releasing previously generated dust particles. Operation in the first state STATE1 may involve a risk of generating dust particles DUST1 and/or a risk of releasing previously generated dust particles.

Setting the power tool TOOL1 to the second state STATE2 may reduce or eliminate the risk of generating or releasing dust particles.

The tool TOOL1 may draw the electric current $I_{AM1}(t)$ from the outlet SOC1 of the dust extractor 500. The electric current $I_{AM1}(t)$ may depend on the state of the power tool TOOL1. The dust extractor 500 may be arranged to control the air flow rate $Q_{AIR1}(t)$ of the dust extractor 500 based on the measured electric current $I_{AM1}(t)$ of the outlet SOC1.

For example, the dust extractor 500 may be arranged to start the air flow AIR1 when the electric current $I_{AM1}(t)$ increases to a first threshold value $LIM1_1$ at a time $t_{ON}$.

For example, the dust extractor 500 may be arranged to stop the air flow AIR1 when the electric current $I_{AM1}(t)$ falls to a second threshold value $LIM2_1$ at a time $t_{OFF}$.

The method may comprise a learning stage STAGE1, and a usage stage STAGE2. The threshold values LIM1, LIM2 may be determined during the learning stage STAGE1. The air flow AIR1 of the dust extractor 500 may be controlled based on the measured electric current $I_{AM1}(t)$ during the usage stage STAGE2.

The method may comprise measuring a first representative current value IR1 when the power tool TOOL1 is in the first state STATE1. The first representative current value IR1 may be measured e.g. at a time $t_{R1}$, when the power tool TOOL1 is operating in the first state STATE1.

The first threshold value $LIM1_1$ may be determined from the first representative current value $I_{R1}$. The first threshold value $LIM1_1$ may be determined e.g. as a linear function of the first representative current value $I_{R1}$. For example, the first threshold value $LIM1_1$ may be e.g. substantially equal to 50% of the first representative current value $I_{R1}$. For example, the first threshold value $LIM1_1$ may be e.g. in the range of 30% to 70% of the first representative current value $I_{R1}$.

The first threshold value $LIM1_1$ may be smaller than the first representative current value $I_{R1}$. Consequently, operation of the tool TOOL1 in the first state STATE1 may cause an electric current $I_{AM1}(t)$ which exceeds the first threshold value $LIM1_1$, so as to ensure reliable start of the air flow AIR1.

The method may comprise measuring a second representative current value $I_{R2}$ when the power tool TOOL1 is in the second state STATE2. The second representative current value $I_{R2}$ may be measured e.g. at a time $t_{R2}$, when the power tool TOOL1 is in the second state STATE2. The first threshold value $LIM1_1$ may be determined from the first representative current value $I_{R1}$ and from the second representative current value $I_{R2}$. The first threshold value $LIM1_1$ may be determined e.g. as a linear combination of the representative current values $I_{R1}$ and $I_{R2}$. The first threshold value $LIM1_1$ may be e.g. substantially equal to the average of the representative current values $I_{R1}$ and IR2.

The first threshold value $LIM1_1$ may be greater than the second representative current value $I_{R2}$ and smaller than the first representative current value $I_{R1}$. Consequently, operation of the tool TOOL1 in the first state STATE1 may cause electric current $I_{AM1}(t)$ which exceeds the first threshold value $LIM1_1$, so as to ensure reliable start of the air flow AIR1, whereas the electric current $I_{AM1}(t)$ of the stopped power tool TOOL1 may be lower than the first threshold value $LIM1_1$ so as to prevent starting the air flow AIR1 in the second state STATE2.

The dust extractor 500 may also be arranged to stop the air flow AIR1 when the electric current $I_{AM1}(t)$ falls to the second threshold value $LIM2_1$ at a time $t_{OFF}$.

The second threshold value $LIM2_1$ may be smaller than the first threshold value $LIM1_1$ so as to provide hysteresis. The second threshold value $LIM2_1$ may be smaller than the first threshold value $LIM1_1$ and smaller than the first representative current value $I_{R1}$. The second threshold value $LIM2_1$ may be determined e.g. as a linear combination of the representative current values $I_{R1}$ and $I_{R2}$. The second threshold value $LIM2_1$ may be smaller than the first threshold value $LIM1_1$, the second threshold value $LIM2_1$ may be smaller than the first representative current value $I_{R1}$, and the second threshold value $LIM2_1$ may be greater than the second representative current value $I_{R2}$. Consequently, the air flow AIR1 may be reliably stopped when the power tool TOOL1 is set to the second state STATE2.

Figure 1B:
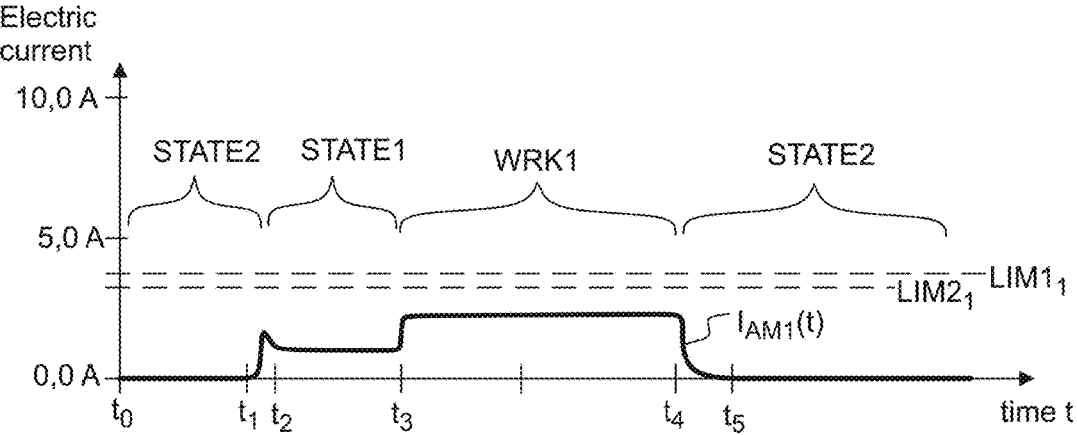
FIG. 1*b* shows, by way of example, temporal evolution of electric current of a second power tool.

FIG. 1b shows, as a comparative example, electric current $I_{AM1}(t)$ drawn by a second power tool TOOL2. The magnitude of the electric current $I_{AM1}(t)$ of the second power tool TOOL2 during the idling period (from time $t_2$ to $t_3$) is smaller than the electric current $I_{AM1}(t)$ of the first power tool TOOL1 of FIG. 1a during the corresponding idling period. In this comparative example, the electric current $I_{AM1}(t)$ does not exceed the first threshold value $LIM1_1$, and the air flow of the dust extractor 500 remains stopped all the time.

Figure 2A:
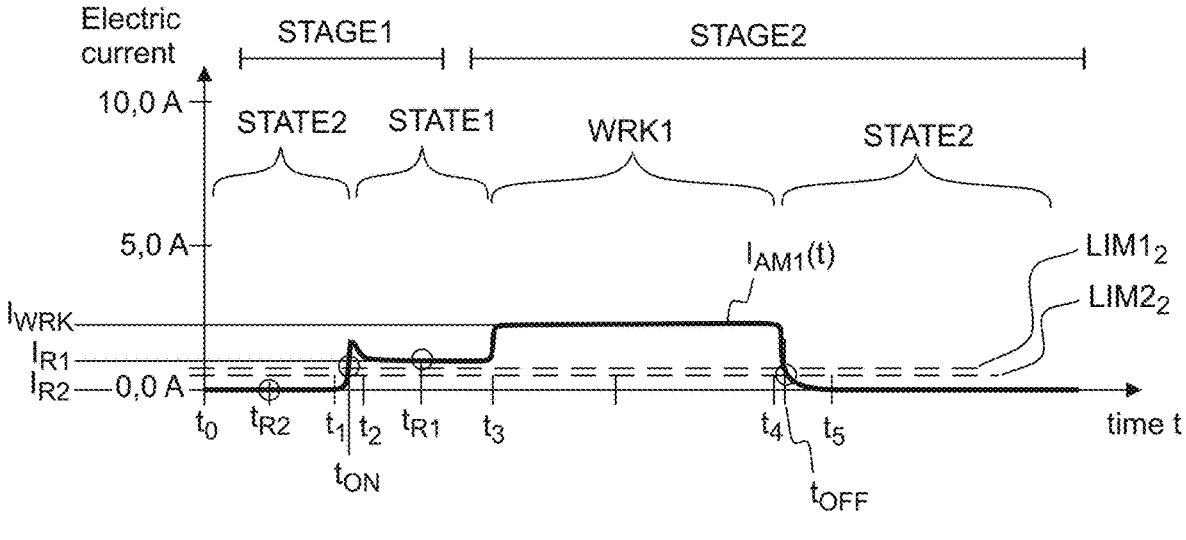
FIG. 2*a* shows, by way of example, temporal evolution of electric current of the second power tool.

Referring to FIG. 2a, different threshold values $LIM1_2$, $LIM2_2$ may be determined to ensure that air flow AIR1 of the dust extractor 500 may be reliably controlled in case of the second power tool TOOL2.

The second power tool TOOL2 may be connected to the outlet SOC1 of the dust extractor 500 after the first power tool TOOL1 has been disconnected. New threshold values $LIM1_2$, $LIM2_2$ may be determined during a new learning stage STAGE1 to ensure reliable operation when using the second power tool TOOL2.

A first threshold value $LIM1_2$ may be determined from a first representative current value $I_{R1}$, which may be measured at a time $t_{R1}$ when the power tool TOOL2 is in the first state STATE1.

A second representative current value $I_{R2}$ may be measured e.g. at a time $t_{R2}$, when the power tool TOOL2 is in the second state STATE2. The first threshold value $LIM1_2$ may be determined from the first representative current value $I_{R2}$ and from the second representative current value $I_{R2}$.

During the usage stage STAGE2, the dust extractor 500 may be arranged to start the air flow AIR1 when the electric current $I_{AM1}(t)$ increases to the first threshold value $LIM1_2$ at a time $t_{ON}$.

The dust extractor 500 may be arranged to stop the air flow AIR1 when the electric current $I_{AM1}(t)$ falls to the second threshold value $LIM2_2$ at a time $t_{OFF}$.

The second threshold value $LIM2_2$ may be smaller than or equal to the first threshold value $LIM1_2$.

Figure 2B:
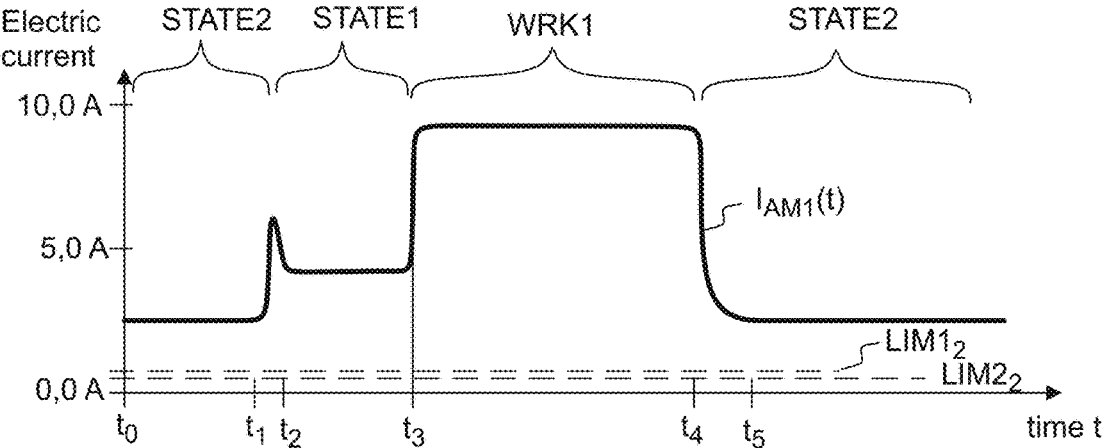
FIG. 2*b* shows, by way of example, temporal evolution of electric current of the first power tool.

FIG. 2b shows, as a comparative example, the electric current $I_{AM1}(t)$ of the first power tool TOOL1 and the threshold values $LIM1_2$, $LIM2_2$ of the second power tool TOOL2. The electric current $I_{AM1}(t)$ of the first power tool TOOL1 does not fall below the threshold value $LIM2_2$ when the power tool is set to the second state STATE2. The air flow of the dust extractor is not properly stopped when the threshold values $LIM1_2$, $LIM2_2$ are too low.

Referring back to FIG. 1a, the threshold values $LIM1_1$, $LIM2_1$ may be determined according to one or more measured electric current values of a power tool TOOL1, so as to ensure that the air flow AIR1 of the dust extractor 500 may be properly controlled based on the measured electric current $I_{AM1}(t)$ of the power tool TOOL1.

Figure 3A:
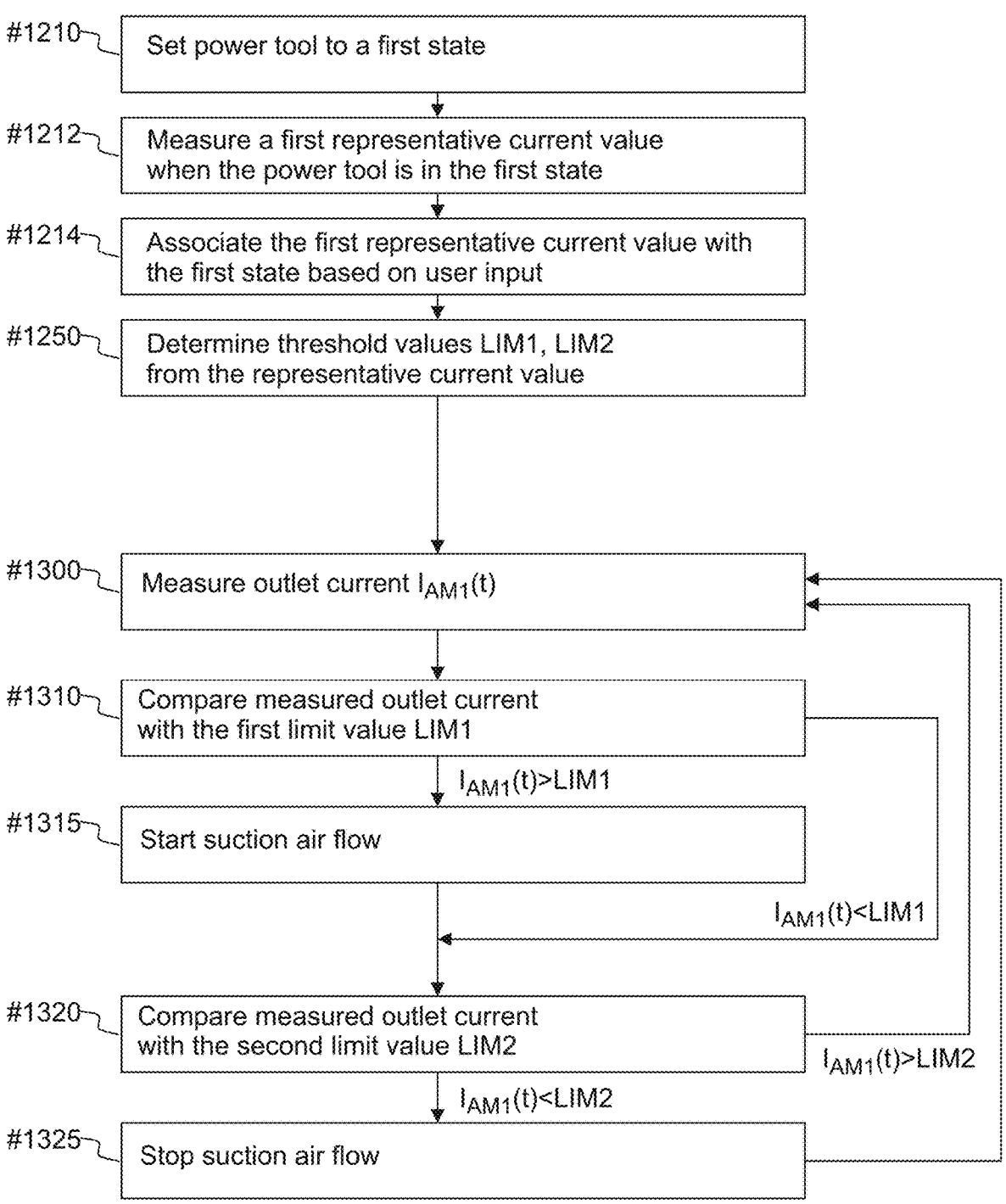
FIG. 3*a* shows, by way of example, method steps for determining a threshold value for controlling operation of the dust extractor, and method steps for controlling operation of the dust extractor.

FIG. 3a shows, by way of example, method steps for determining a first threshold value LIM1 for controlling operation of the dust extractor, and method steps for controlling operation of the dust extractor by using the first threshold value LIM1.

The power tool TOOL1 may be electrically connected to the electric outlet SOC1 of the dust extractor 500.

The learning stage STAGE1 may be started e.g. by providing user input via the user interface of the dust extractor, or by connecting the power tool to the electric outlet of the dust extractor.

The power tool TOOL1 may be set to operate in the first state STATE1 in step #1210.

A first representative current value $I_{R1}$ of the electric outlet SOC1 may be measured when the power tool TOOL1 is in the first state STATE1 (step #1212).

The first representative current value $I_{R1}$ may be associated with the first state STATE1 based on first user input INPUT1 (step #1214).

In an embodiment, the steps #1212 and #1214 may be performed at the same time. For example, the control system SYS1 may measure the first representative current value $I_{R1}$ at a time $t_{R1}$ when the control system SYS1 receives user input INPUT1 via the user interface UIF1, wherein receipt of said user input INPUT1 may also associate said measured first representative current value $I_{R1}$ with the first state STATE1.

For example, the method may comprise:
asking the user to press a button of the user interface when the power tool is in the first state, pressing the button when the power tool is in the first state, measuring the first representative current value when the button is pressed, and associating the first representative current value with the first state based on the pressing of the button.

The user may confirm by pressing the button of the user interface that the power tool is in the first state so that the first representative current value $I_{R1}$ measured at the time $t_{R1}$ may be associated with the first state STATE1.

The button is mentioned as an example. The user input(s) may also be provided via one or more other input devices, instead or in addition to the button(s).

The measured first representative current value $I_{R1}$ may be associated with the state STATE1 based on user input INPUT1 received when the power tool TOOL1 is in the first state STATE1.

The first threshold value LIM1 for starting the air flow AIR1 may be determined from the first representative current value $I_{R1}$ in step #1250.

A second threshold value LIM2 for stopping the air flow AIR1 may be determined. The second threshold value LIM2 may be equal to or smaller than the first threshold value LIM1. The second threshold value LIM2 may be smaller than the first threshold value LIM1 in order to provide hysteresis.

The determined threshold values LIM1, LIM2 may be stored in a memory (e.g. MEM3). After the threshold value LIM1 or threshold values LIM1, LIM2 have been determined and stored in the memory, then the operation of the dust extractor 500 may be controlled based on the measured electric current $I_{AM1}(t)$ of the power tool TOOL1.

The learning stage STAGE1 may be stopped and/or the usage stage STAGE2 may be started after the threshold values LIM1, LIM2 have been determined.

The learning stage STAGE1 may be stopped and/or the usage stage STAGE2 may be started based on user input (e.g. INPUT1 or INPUT2).

The electric current $I_{AM1}(t)$ of the power tool TOOL1 may be measured intermittently or continuously in step #1300.

The measured electric current $I_{AM1}(t)$ may be compared with the first threshold value LIM1 in step #1310. The air flow AIR1 of the dust extractor 500 may be controlled based on the result of the comparison.

The air flow AIR1 of the dust extractor 500 may be started if the measured electric current $I_{AM1}(t)$ increases to or exceeds the first threshold value LIM1 in step #1315.

The measured electric current $I_{AM1}(t)$ may be compared with the second threshold value LIM2 in step #1320. The air flow AIR1 of the dust extractor 500 may be controlled based on the result of the comparison.

The air flow AIR1 of the dust extractor 500 may be stopped if the measured electric current $I_{AM1}(t)$ falls to or below the second threshold value LIM2 in step #1325.

The operation of the dust extractor 500 may be controlled e.g. by repeating the steps #1300 to #1325.

In an embodiment, the control system SYS1 of the dust extractor 500 may detect when the connector PLUG1 of the power tool TOOL1 is separated from the electric outlet SOC1 of the dust extractor 500. For example, the control system SYS1 may comprise a sensor for detecting whether a connector PLUG1 is in connection with the outlet SOC1 or not. The sensor may be e.g. a mechanical, optical, capacitive or inductive sensor.

In an embodiment, the control system SYS1 may start to operate in a default operating mode after the control system SYS1 detects that the connector PLUG1 has been separated from the electric outlet SOC1. In the default operating mode, the first threshold value LIM1 may be set to a default value. The first threshold value LIM1 may be equal to the default value until a different value is determined e.g. by the steps #1210 to #1250.

FIG. 3b shows, by way of example, method steps for determining a first threshold value LIM1 for controlling operation of the dust extractor, and method steps for controlling operation of the dust extractor by using the first threshold value LIM1.

In addition to the method steps shown in FIG. 3a, the method of 3b may comprise method steps #1220, #1222, #1224 for setting the power tool TOOL1 to a second state STATE2, measuring a second representative current value $I_{R2}$, and associating the second representative current value $I_{R2}$ with the second state STATE2.

The motor MOTOR2 of the power tool TOOL1 may rotate in the first state STATE1. The motor MOTOR2 of the power tool TOOL1 may be stopped in the second state STATE2. The second state STATE2 may be e.g. a standby state or a power off state.

The power tool TOOL1 may be set to operate in the first state STATE1 in step #1210.

A first representative current value $I_{R1}$ of the electric outlet SOC1 may be measured when the power tool TOOL1 is in the first state STATE1 (step #1212).

The first representative current value $I_{R1}$ may be associated with the first state STATE1 based on first user input INPUT1 (step #1214).

In an embodiment, the steps #1212 and #1214 may be performed at the same time. For example, the control system SYS1 may measure the first representative current value $I_{R1}$ at a time $t_{R1}$ when the control system SYS1 receives user input INPUT1 via the user interface UIF1, wherein receipt of said user input INPUT1 may also associate said measured first representative current value $I_{R1}$ with the first state STATE1.

The power tool TOOL1 may be set to operate in the second state STATE2 in step #1220.

A second representative current value $I_{R2}$ of the electric outlet SOC1 may be measured when the power tool TOOL1 is in the second state STATE2 (step #1222).

The second representative current value $I_{R2}$ may be associated with the second state STATE2 based on second user input INPUT2 (step #1224).

For example, the method may comprise:

asking the user to press a button of the user interface when the power tool is in the second state, pressing the button when the power tool is in the second state, measuring the second representative current value when the button is pressed, and associating the second representative current value with the second state based on the pressing of the button.

The steps #1220 to #1224 may be performed e.g. before or after the steps #1210 to #1214.

After the threshold value LIM1 or threshold values LIM1, LIM2 have been determined and stored in the memory, then the operation of dust extractor 500 may be controlled based on the measured electric current $I_{AM1}(t)$ of the power tool TOOL1.

The learning stage STAGE1 may be stopped and/or the usage stage STAGE2 may be started based on user input (e.g. INPUT1 or INPUT2).

The operation of the dust extractor 500 may be controlled e.g. by repeating the steps #1300 to #1325.

FIG. 4a shows, by way of example, an apparatus 1000, which comprises a power tool TOOL1 (or TOOL2) and a dust extractor 500. The apparatus 1000 may be e.g. a surface processing apparatus.

The dust extractor 500 may comprise a rotating suction fan FAN1 to cause a partial vacuum ($p_1$), which in turn may draw an air flow AIR1 through a hose HOSE1 connected to the dust extractor 500. The fan FAN1 may be e.g. an axial fan and/or a centrifugal fan. The dust extractor 500 may comprise a motor MOTOR1 for rotating the suction fan FAN1. The air flow AIR1 may be started by starting rotation of the fan FAN1. The air flow AIR1 may be stopped by stopping rotation of the fan FAN1.

Increasing the rotation speed of the motor MOTOR1 and the fan FAN1 may cause a lower inner pressure $p_1$, thereby increasing the air flow rate $Q_{AIR1}$ through the hose HOSE1 and through the suction fan FAN1. Decreasing the rotation speed of the motor MOTOR1 may cause a higher inner pressure $p_1$, thereby decreasing the air flow rate $Q_{AIR1}$.

The dust extractor 500 may be arranged to suck dust particles DUST1 carried by the suction air flow AIR1. The dust extractor 500 may also be called e.g. as a vacuum cleaner.

The dust extractor 500 may comprise a particle separator FIL1 to separate dust particles DUST1 from the air flow AIR1. The particle separator FIL1 may comprise e.g. a filter and/or a cyclone. The particle separator FIL1 may collect the separated dust particles DUST1. The suction fan FAN1 may draw the air flow AIR1 through the particle separator FIL1.

The apparatus 1000 may comprise a flexible hose HOSE1 connected to the dust extractor 500. The hose HOSE1 may convey an air flow AIR1 and dust particles DUST1 to the dust extractor 500. The hose HOSE1 may convey an air flow AIR1 and dust particles DUST1 e.g. from a working area of a power tool TOOL1 to the dust extractor 500. The power tool TOOL1 may be e.g. a sander, a drilling machine, or a sawing machine.

The apparatus 1000 may be e.g. a surface processing apparatus. The surface processing apparatus 1000 may comprise a power tool TOOL1 for processing a surface SRF1 of an object OBJ1. The power tool TOOL1 may be e.g. a rotary sander, an orbital sander or a belt sander.

The dust extractor 500 comprises an air inlet IN1 for the suction air flow AIR1.

The dust extractor 500 may be arranged to draw the dust-laden air flow AIR1 via the openings OP1 and via the hose HOSE1 to the inlet IN1. The suction hose HOSE1 may be detachably connectable to the inlet IN1. The hose HOSE1 may be connected to the inlet IN1 e.g. by using an adapter connector ADA1.

The dust extractor 500 has an air outlet OUT1 for discharging the air flow AIR1 to the surroundings, after the dust particles DUST1 carried by the air flow AIR1 have been separated from the air flow AIR1.

$p_0$ denotes the ambient atmospheric pressure. Pressure near the power tool TOOL1 and at the air outlet OUT1 of the dust extractor 500 may be substantially equal to the atmospheric pressure $p_0$. The ambient pressure $p_0$ is typically substantially equal to 101.3 kPa. $p_{CHM1}$ denotes an internal pressure of the inlet chamber CHM1 of the dust extractor 500. The pressure $p_{CHM1}$ may also denote the upstream pressure of the particle separator FIL1 (e.g. filter). The pressure difference $p_0$-$p_{CHM1}$ may draw the dust-laded air flow AIR1 from the abrasive article ABR1 to the inlet chamber CHM1 of the dust extractor 500 via the hose HOSE1.

The rotating fan FAN1 may cause the partial vacuum $p_1$, which prevails between the particle separator FIL1 and the fan FAN1. $p_1$ denotes an upstream pressure of the fan FAN1 and downstream pressure of the particle separator FIL1. The pressure $p_1$ may be the lowest pressure of the apparatus 1000. $p_2$ denotes a downstream pressure of the fan FAN1. The maximum pressure difference ($p_2$-$p_1$) over the fan FAN1 may be e.g. in the range of 5 to 30 kPa.

The dust extractor device 500 may comprise a dust chamber CHM1 for guiding the dust-laded airflow AIR1 from the inlet IN1 to the dust separator FIL1 and/or for collecting the separated dust DUST1. The dust extractor device 500 may comprise an air flow chamber CHM2 for guiding the air flow AIR1 from the fan FAN1 to the air outlet OUT1.

The dust extractor 500 comprises an electric outlet SOC1 connectable to a power tool TOOL1, TOOL2. An electric cable CBL1 of the power tool TOOL1 may be connected to the electric outlet SOC1 of the dust extractor 500.

Operation of the power tool TOOL1 may generate dust particles DUST1. The dust extractor 500 may be arranged to remove the generated dust particles DUST1 via a hose HOSE1.

The power tool TOOL1 may be arranged to process a surface SRF1 of an object OBJ1. The apparatus 1000 may be e.g. a surface processing apparatus 1000. The power tool TOOL1 may be e.g. a sanding machine, e.g. an orbital sanding machine.

The control system SYS1 of the dust extractor 500 may comprise a current meter unit AM1 to measure an electric current $I_{AM1}(t)$ drawn by the power tool TOOL1 via the electric outlet SOC1. The current meter unit AM1 may measure one or more electric currents $I_{AM1}(t)$ transmitted via the electric outlet SOC1.

The control system SYS1 may comprise a user interface UIF1 for receiving user input from a user and/or for providing information to the user. The control system SYS1 may comprise a user interface UIF1 for receiving user input INPUT1, INPUT2.

The control system SYS1 may be arranged to associate the first measured representative current value $I_{R1}$ with the first state STATE1 based on first user input INPUT1. The control system SYS1 may be arranged to associate the second measured representative current value $I_{R2}$ with the second state STATE2 based on second user input INPUT2.

The control system SYS1 may be arranged to determine threshold values LIM1, LIM2 from the measured representative current values $I_{R1}$, $I_{R2}$. The control unit CNT1 may be arranged to determine threshold values LIM1, LIM2 from the measured representative current values $I_{R1}$, $I_{R2}$. The control system SYS1 may comprise a memory MEM3 for storing the determined threshold values LIM1, LIM2.

The control system SYS1 may control operation of the dust extractor 500 based on the measured electric current $I_{AM1}(t)$. The control system SYS1 may compare the measured electric current $I_{AM1}(t)$ with the threshold values LIM1, LIM2.

The control system SYS1 may start and/or stop the air flow AIR1 based on a result of the comparison. The dust extractor 500 may comprise a control unit CNT1 for controlling operation of the motor MOTOR1 based on measured electric current $I_{AM1}(t)$ of the electric outlet SOC1.

The motor MOTOR1 may be e.g. an asynchronous or synchronous electric motor. The motor MOTOR1 may be e.g. an alternating current motor or a direct current motor. The motor MOTOR1 may be e.g. an universal motor. The motor MOTOR1 may be e.g. brushless direct current motor.

The control system SYS1 may comprise a motor driving unit MDU1 for driving the motor MOTOR1 according to a motor control signal $S_{MOTOR1}$. The motor driving unit MDU1 may provide one or more electric currents EC1 to the motor MOTOR1 according to the motor control signal $S_{MOTOR1}$. The motor driving unit MDU1 may comprise e.g. one or more electromechanical relays, thyristors and/or transistors for controlling one or more operating currents of the motor MOTOR1. The motor driving unit MDU1 may comprise e.g. power transistors and/or thyristors for providing the electric currents EC1 for the motor MOTOR1. In an embodiment, the motor driving unit MDU1 may comprise a frequency converter for reducing or increasing the rotation speed of the motor MOTOR1. The motor driving unit MDU1 may provide one or more electric currents EC1 in response to the motor control signal $S_{MOTOR1}$. The control unit CNT1 may form the motor control signal $S_{MOTOR1}$ based on the measured electric current $I_{AM1}(t)$.

The control system SYS1 may form the motor control signal $S_{MOTOR1}$ for the motor driving unit MDU1. The motor driving unit MDU1 may start or stop rotation of the motor MOTOR1 based on the motor control signal $S_{MOTOR1}$. The motor driving unit MDU1 may reduce or increase air flow rate $Q_{AIR1}(t)$ of the dust extractor 500 based on the motor control signal $S_{MOTOR1}$.

The electrical system of the dust extractor 500 may receive electric operating power from a mains network MAINS1 via two or more nodes N1, N0. The nodes N0, N1 may be connected to the AC mains network MAINS1. AC means alternating current. The voltage and the frequency of the network MAINS1 may be e.g. 230 V at 50 Hz or 110 V at 60 Hz. The electric power may be distributed from the nodes N1, N0 to the electric outlet SOC1 and to the motor driving unit MDU1. The electric power may be distributed from the nodes N1, N0 to the electric outlet SOC1 via conductors W1, W0.

The current metering unit AM1 may be arranged to measure the current $I_{AM1}(t)$ of the first conductor W1 and/or the current of the second conductor W2. During normal operation, the current $I_{AM1}(t)$ of the first conductor W1 may be equal to the current $I_{AM0}(t)$ of the second conductor W0.

The electric outlet SOC1 may be e.g. a socket according to the standard CEE 7/3, which is also known as the "Schuko" socket. The standard CEE 7/3 has been determined by the International Commission on the Rules for the Approval of Electrical Equipment (IECEE). Sockets according to CEE 7/3 are widely in use e.g. in Germany.

The electric outlet SOC1 may be e.g. a socket according to the standard NEMA 5-15 grounded (Type B). The standard NEMA has been determined by the National Electrical Contractors Association (NECA). Sockets according to the standard NEMA 5-15 grounded (Type B) are widely in use e.g. in the USA.

The RMS voltage level $V_1(t)$ of the outlet SOC may be e.g. in the range of 100 V to 240 V. The RMS voltage level $V_1(t)$ of the outlet SOC may be substantially equal to the voltage of the mains network MAINS1.

The first power tool TOOL1 may be initially connected to the electric outlet SOC1. The threshold values LIM1, LIM2 may be determined from the representative current values $I_{R1}$, $I_{R2}$ associated with the states STATE1, STATE2, e.g. as shown in FIG. 3a or 3b. The first power tool TOOL1 may be used for processing the object OBJ1. The control system SYS1 may start the air flow AIR1 based on the measured current $I_{AM1}(t)$ when the first power tool TOOL1 starts to operate in the first state STATE1. The control system SYS1 may stop the air flow AIR1 based on the measured current $I_{AM1}(t)$ when the first power tool TOOL1 is set into the second state STATE2 (standby).

Next, the first power tool TOOL1 may be disconnected from the electric outlet SOC1, and a second power tool TOOL2 may be connected to the electric outlet SOC1. New threshold values LIM1, LIM2 may subsequently be determined from the representative current values associated with the states, e.g. as shown in FIG. 3a or 3b. The second power tool TOOL2 may be used for processing the object OBJ1 or another object. The control system SYS1 may start the air flow AIR1 based on the measured current $I_{AM1}(t)$ when the second power tool TOOL2 starts to operate in the first state STATE1. The control system SYS1 may stop the air flow AIR1 based on the measured current $I_{AM1}(t)$ when the second power tool TOOL2 is set into the second state STATE2 (standby).

Controlling operation of the dust extractor 500 based on the measured current $I_{AM1}(t)$ may save energy, may reduce cumulative dose of noise, may reduce noise level in the second state STATE2, and/or may increase operating lifetime of the dust extractor 500.

Figure 4B:
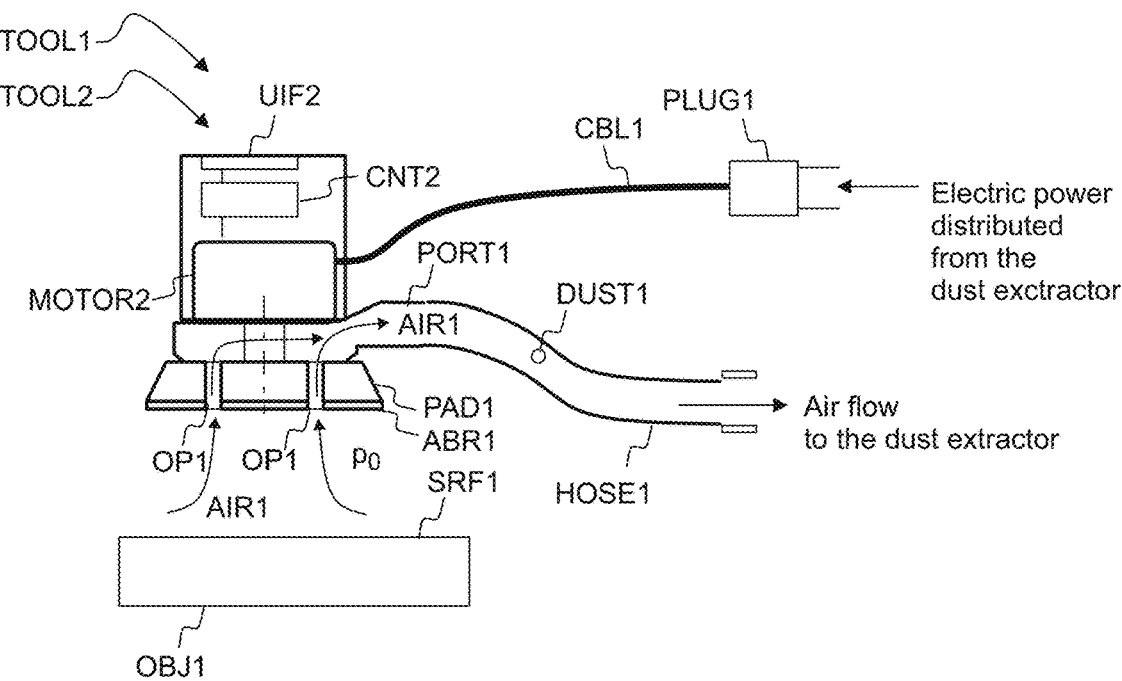
FIG. 4*b* shows, by way of example, a power tool.

Referring to FIG. 4b, the power tool TOOL1, TOOL2 may comprise an electric motor MOTOR2 for causing relative movement of a processing element ABR1 with respect to an object OBJ1. The motor MOTOR2 and other components of the power tool TOOL1, TOOL2 may be powered by the electric current $I_{AM1}(t)$ received from the outlet SOC1 via a cable CBL1. The cable CBL1 may comprise an electric connector PLUG1 connectable to the outlet SOC1 of the dust extractor 500.

The power tool TOOL1, TOOL2 may be used for processing the object OBJ1. The apparatus 1000 may be a processing apparatus.

The power tool may be used for processing a surface SRF1 of the object OBJ1. The apparatus 1000 may be a surface processing apparatus.

For example, the power tool TOOL1 may comprise an abrasive article ABR1, which comprises abrasive grains. The tool TOOL1 may comprise a supporting pad PAD1. The abrasive article ABR1 may be attached to the pad PAD1. The tool TOOL1 may comprise a motor MOTOR2 for causing a movement of the abrasive article ABR1 with respect to the surface SRF1. The tool TOOL1 may comprise a motor MOTOR2 for causing rotary and/or oscillatory movement of the abrasive article ABR1 with respect to the surface SRF1. Pressing the abrasive article ABR1 against the surface SRF1 may generate dust particles DUST1, which may comprise particles released from the surface SRF1 and/or particles released from the abrasive article ABR1.

The tool TOOL1 may comprise one or more openings OP1 for extracting released particles DUST1 together with an air flow AIR1. The power tool TOOL1, TOOL2 may comprise one or more openings OP1 for the suction air flow AIR1. The power tool may comprise an outlet port PORT1 connectable to a hose HOSE1. Dust particles DUST1 carried by the air flow AIR1 may be sucked via the openings OP1, via the outlet port PORT1, and via a hose HOSE1 to the dust extractor 500.

The power tool TOOL1, TOOL2 may be e.g. a sander or a grinding device. The processing element ABR1 may be e.g. an abrading element, which comprises a plurality of abrasive grains.

The power tool TOOL1, TOOL2 may have at least one operating state STATE1, which has a considerable risk of generating dust DUST1. The power tool TOOL1, TOOL2 may be e.g. a sander device, a grinding device, tile cutter, a milling machine, a router, a saw, a rotary saw, a bandsaw, an oscillating saw, a drill.

The power tool may comprise a user interface UIF2 for receiving user input and/or for providing information to the user. The power tool may comprise a control unit CNT2 for controlling operation of the power tool based on user input received via the user interface UIF2. For example, the control unit CNT2 may start rotation of the motor MOTOR2 when a user input is provided by pressing a button of the user interface UIF2. For example, the control unit CNT2 may stop rotation of the motor MOTOR2 when the user stops pressing the button of the user interface UIF2. For example, the control unit CNT2 may be energized all the time when the power tool is connected to the mains network MAINS1 via the outlet SOC1 of the dust extractor 500.

Figure 4C:
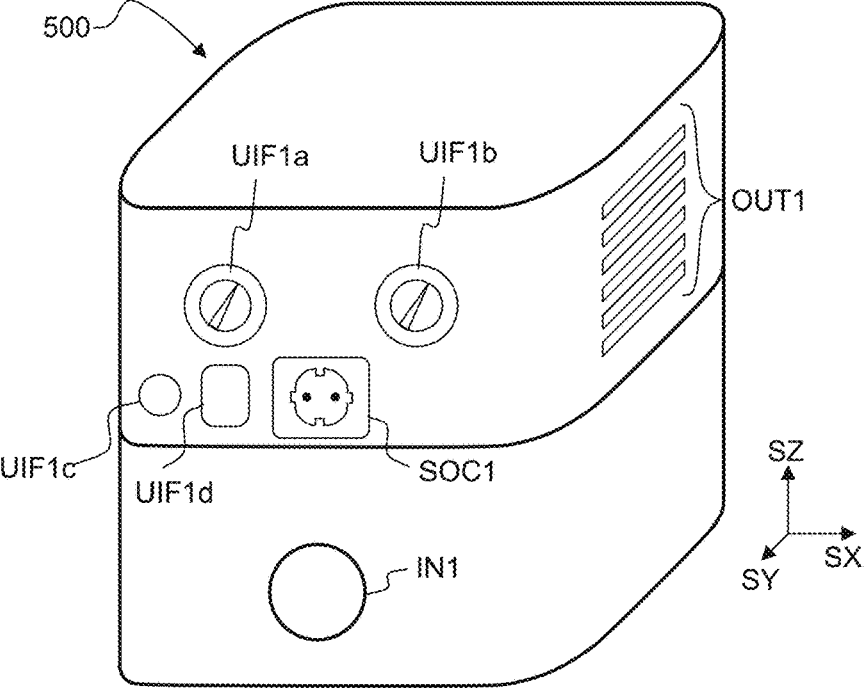
FIG. 4*c* shows, by way of example, the dust extractor.

Referring to FIG. 4*c*, the dust extractor 500 may comprise the suction air inlet AIR1, the electric outlet SOC1 for the power tools, the air outlet OUT1, and user interface devices UIF1*a*, UIF1*b*, UIF1*c*, UIF1*d*.

The user interface UIF1 may comprise e.g. input devices UIF1*a*, UIF1*b*, UIF1*c* and/or an output device UIF1*d*.

The user interface UIF1 may comprise an input device UIF1*a* for inputting a power setting of the motor MOTOR1. The input device UIF1*a* may be implemented e.g. by a rotary handle, by a sliding handle, and/or by one or push buttons. A user may manually move the handle so as to select a target power setting of the motor MOTOR1. The input device UIF1*a* may provide the selected target power level as an input to the control system SYS1.

The user interface UIF1 may comprise an input device UIF1*b* for setting an operating mode of the dust extractor 500. For example, the dust extractor 500 may have a first operating mode where the dust extractor 500 operates only when electric power is drawn from the outlet SOC1. The auto start functionality of the dust extractor may be enabled in the first operating mode. The dust extractor 500 may have a second operating mode where the dust extractor 500 operates continuously. The auto start functionality of the dust extractor may be disabled in the second operating mode.

The dust extractor 500 may have a first operating mode where the air flow AIR1 is controlled according to the measured electric current $I_{AM1}(t)$ of the outlet SOC1. The dust extractor 500 may have a second operating mode where the air flow AIR1 is independent of the measured electric current $I_{AM1}(t)$ of the outlet SOC1. The input device UIF1*b* may be implemented e.g. by a rotary handle, by a sliding handle, and/or by one or push buttons.

The user interface UIF1 may comprise an input device UIF1*c* for associating a measured current value with a state (STATE1) of a power tool TOOL1. The input device UIF1*c* may comprise e.g. one or more push buttons.

The button is mentioned as an example. One or more other input devices may be used instead of or in addition to the button. The input device may be e.g. a touchscreen.

The user interface UIF1 may comprise an output device UIF1*d* for providing information to a user. The output device UIF1*d* may comprise e.g. a one or more indicator lights to indicate when the user is expected to provide the user input INPUT1 and/or INPUT2. The output device UIF1*d* may comprise e.g. a display to indicate when the user is expected to provide the user input INPUT1 and/or INPUT2. For example, the output device UIF1*d* may provide a visual prompt and/or an audible prompt for the user.

The indicator light is mentioned as an example. One or more other output device may be used instead of or in addition to the indicator light(s). The output device may be e.g. a display, in particular a touchscreen.

SX, SY, and SZ denote orthogonal directions.

Figure 5:
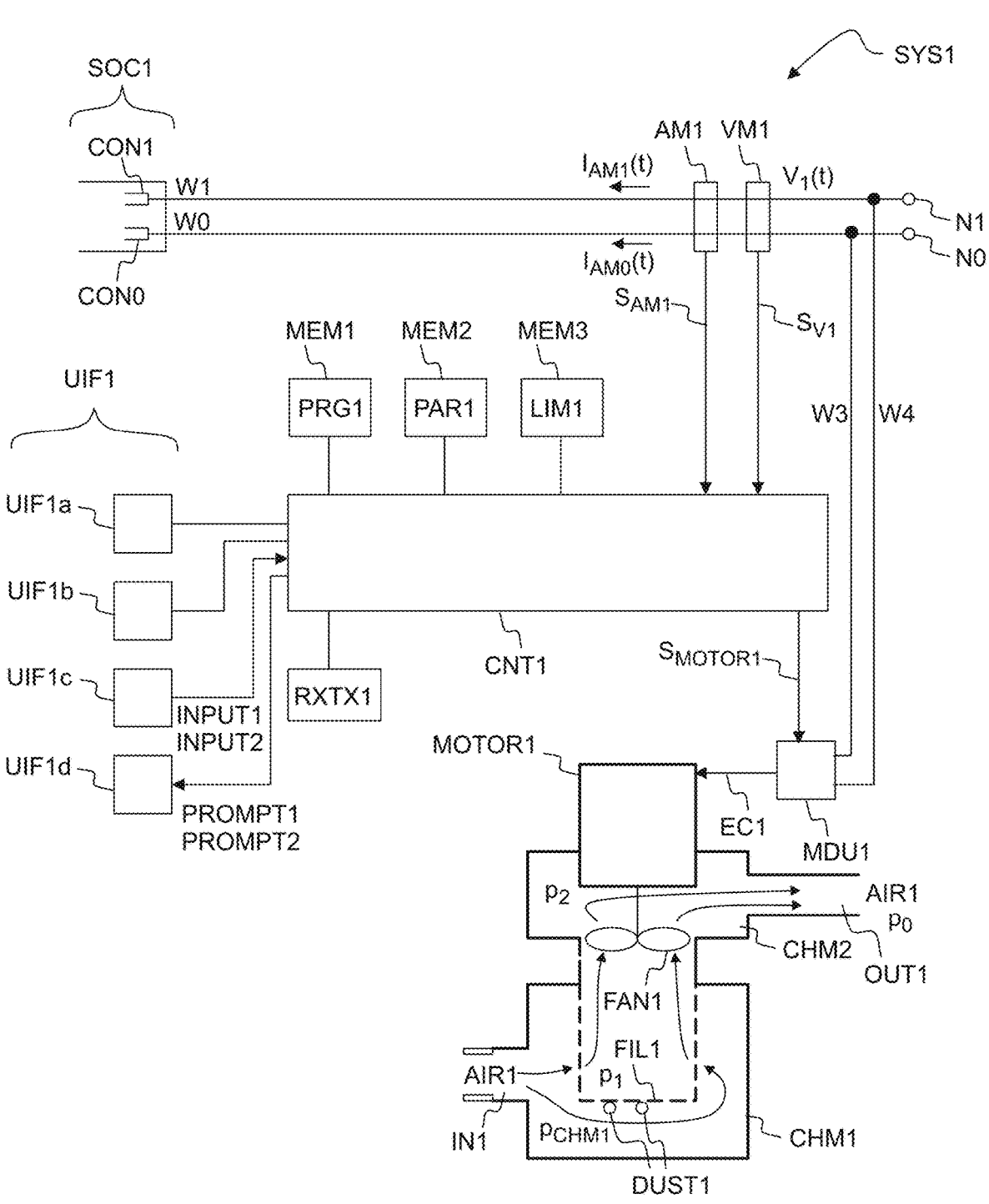
FIG. 5 shows, by way of example, a control system of the dust extractor.

FIG. 5 shows, by way of example, the control system SYS1 of the dust extractor 500. The control system SYS1 may comprise the control unit CNT1, a current measuring unit AM1, a user interface UIF1, and a motor driving unit MDU1.

The current measuring unit AM1 may form a current indicator signal $S_{AM1}$ indicative of the measured electric current $I_{AM1}(t)$ of the outlet SOC1.

During the learning stage STAGE1, the current measuring unit AM1 may measure the representative current values $I_{R1}$, $I_{R2}$ for determining the threshold values LIM1, LIM2.

During the usage stage STAGE2, the current measuring unit AM1 may continuously or intermittently measure the electric current $I_{AM1}(t)$ of the outlet SOC1 for controlling the air flow AIR1 based on the electric current $I_{AM1}(t)$.

The control unit CNT1 may receive the current indicator signal $S_{AM1}$. The control unit CNT1 may control the air flow AIR1 based on the measured current $I_{AM1}(t)$. The control unit CNT1 may form a motor control signal $S_{MOTOR1}$ based on the measured current $I_{AM1}(t)$, so as to control the air flow AIR1.

The motor driving unit MDU1 may drive the motor MOTOR1 of the dust extractor 500 by forming one or more electric driving currents EC1. The motor driving unit MDU1 may form the electric driving currents EC1 from electric power received via the nodes N0, N1. The motor driving unit MDU1 may form the electric driving currents EC1 according to the motor control signal $S_{MOTOR1}$ formed by the control unit CNT1.

The motor driving unit MDU1 may comprise e.g. a relay to switch on and off one or more driving currents EC1 of the motor MOTOR1. The motor driving unit MDU1 may be arranged to adjust one or more driving currents EC1 by pulse width modulation or by phase fired control. The motor driving unit MDU1 may comprise e.g. a frequency converter to adjust the frequency of one or more driving currents EC1.

The user interface UIF1 may comprise one or more input devices UIF1*a*, UIF1*b*, UIF1*c*. The user interface UIF1 may comprise one or more output devices UIF1*d*. The user interface UIF1 may be arranged to receive user input INPUT1, INPUT2 from a user to the control unit CNT1.

The dust extractor 500 may receive electric power from the mains network via two or more nodes N0, N1. The electric power may be distributed from the nodes N0, N1 to the outlet SOC1 and to the motor driving unit MDU1. The electric power may be distributed from the nodes N0, N1 to the motor driving unit MDU1 e.g. via conductors W3, W4.

The outlet SOC1 may comprise two or more connectors CON1, CON1 to form a galvanic contact with the conductors of the cable CBL1 of the power tool TOOL1, TOOL2.

A first electric current $I_{AM1}(t)$ may be transmitted from the first node N1 to a first connector CON1 of the outlet SOC1 via a first conductor W1. A second electric current $I_{AM0}(t)$ may be transmitted from the second node N0 to a second connector CON0 of the outlet SOC1 via a second conductor W0.

The current metering unit AM1 may measure the first electric current $I_{AM1}(t)$ and/or the second electric current $I_{AM0}(t)$. The current metering unit AM1 may form a current indicator signal $S_{AM1}$ indicative of the measured electric current $I_{AM1}(t)$. The sum of the electric currents may be equal to zero during normal operation, i.e. $I_{AM1}(t)+I_{AM0}(t)=0$.

The control system SYS1 may be arranged start operation in a learning stage STAGE1 e.g. based on user input received via the user interface UIF1 and/or when the dust extractor 500 is connected to the mains network MAINS1. The threshold values LIM1, LIM2 may be determined in the learning stage STAGE1

The output device UIF1$d$ may be arranged to provide a first prompt PROMPT1 for the user to indicate when the control system SYS1 is ready to receive first user input INPUT1. For example, the first prompt PROMPT1 may contain a message "press the button when the tool is in the first state".

The input device UIF1$c$ may be arranged to receive the user input INPUT1 for associating a measured representative current value $I_{R1}$ with the first state STATE1 of the power tool TOOL1, TOOL2. For example, the input device UIF1$c$ may comprise one or more push buttons. The current measuring unit AM1 may measure the first representative current value $I_{R1}$ in a situation where the power tool TOOL1 operating in the first state STATE1 is connected to the outlet SOC1. The control system SYS1 of the dust extractor 500 may associate the measured representative current value $I_{R1}$ with the first state STATE1 e.g. when the user provides user input INPUT1 via the input device UIF1$c$ during operation in the first state STATE1. The control system SYS1 may associate the measured representative current value $I_{R1}$ with the first state STATE1 e.g. when the user pushes a button of the input device UIF1$c$ during operation in the first state STATE1.

The output device UIF1$d$ may be arranged to provide a second prompt PROMPT2 for the user to indicate when the control system SYS1 is ready to receive the second user input INPUT2. For example, the second prompt PROMPT2 may indicate or contain a message "press the button when the tool is in the second state".

The input device UIF1$c$ may be arranged to receive user input INPUT2 for associating a measured representative current value $I_{R2}$ with the second state STATE2 of the power tool TOOL1, TOOL2. For example, the input device UIF1$c$ may comprise one or more push buttons. The current measuring unit AM1 may measure an electric current value $I_{R2}$ in a situation where the power tool TOOL1 connected to the outlet SOC1 is in the second state STATE2. The control system SYS1 of the dust extractor 500 may associate the measured representative current value $I_{R2}$ with the second state STATE2 e.g. when the user provides user input INPUT2 via the input device UIF1$c$. The control system SYS1 may associate the measured representative current value $I_{R1}$ with the first state STATE1 e.g. when the user pushes a button of the input device UIF1$c$ during operation in the first state STATE1.

The user interface UIF1 may comprise an input device UIF1$a$ for setting a target power of the motor MOTOR1 (e.g. low power, medium power, high power). The input device UIF1$a$ may be implemented e.g. by a rotary handle, by a sliding handle, and/or by one or push buttons.

The user interface UIF1 may comprise an input device UIF1$b$ for setting an operating mode of the dust extractor 500. The input device UIF1$b$ may be implemented e.g. by a rotary handle, by a sliding handle, and/or by one or push buttons.

In an embodiment, the dust extractor 500 may comprise e.g. a keypad or a touch screen for receiving user input.

The control unit CNT1 may be implemented e.g. by one or more data processors. The control system SYS1 may comprise a machine-readable memory MEM1 for storing computer program code PRG1. The control unit CNT1 may be implemented e.g. by executing program code PRG1 by one or more data processors of the control system SYS1. The program code PRG1, when executed by one or more processors of the control unit CNT1 may cause the control unit CNT1 to determine threshold values (LIM1, LIM2) and/or to control the air flow based on the measured electric current.

The control system SYS1 may comprise a machine-readable memory MEM2 for storing operating parameters PAR1 of the extractor device 500. The operating parameters PAR1 may specify e.g. a time delay between initiating a stopping of the air flow, and stopping operation of the motor MOTOR1.

The control system SYS1 may comprise a machine-readable memory MEM3 for storing determined threshold values LIM1, LIM2.

The control system SYS1 may comprise a communication unit RXTX1 for enabling communication with one or more external devices. The communication unit RXTX1 may enable communication e.g. via Bluetooth, wireless local area network, and/or wireless mobile communications network.

For example, the communication unit RXTX1 may enable communication with a mobile phone.

In an embodiment, the user interface UIF1 of the control system SYS1 may be implemented by using a mobile phone. The control system SYS1 may be arranged to receive user input INPUT1, INPUT2 from a mobile phone via the communication unit RXTX1. The user interface UIF1 (UIF1$a$, UIF1$b$, UIF1$c$, UIF1$d$) may be implemented e.g. by an application running on a mobile phone. The (mobile) user interface UIF1 may communicate with the dust extractor 500 e.g. via wireless communication. The (mobile) user interface UIF1 may communicate with the dust extractor 500 e.g. via the communication unit RXTX1.

In an embodiment, the method may comprise changing the state of the power tool TOOL1 between a first state STATE1 and a second state STATE2 during the learning stage STAGE1, and the control system SYS1 may continuously or intermittently record the electric current $I_{AM1}(t)$ during the learning stage STAGE1. The user may stop the learning stage STAGE1 by providing user input (INPUT1) via the user interface UIF1. The control system SYS1 may be configured to determine that the first representative current value $I_{R1}$ is equal to the maximum stable current value measured during the learning stage STAGE1, and to determine that the second representative current value $I_{R2}$ is equal to the minimum stable current value measured during the learning stage STAGE1. The user input (INPUT1) defines the end of the learning stage STAGE1, which comprises a time period where the power tool TOOL1 is in the first state STATE1. Thus, the control system SYS1 may associate the first representative current value $I_{R1}$ with the first state STATE1 based on the user input (INPUT1).

In an embodiment, the dust extractor 500 may be arranged to operate such that the air flow AIR1 is not completely stopped when the power tool TOOL1 is in the second state STATE2, e.g. in order to reduce risk of releasing of harmful dust particles DUST1 to the environment. The air flow rate $Q_{AIR1}(t)$ of the dust extractor 500 may be e.g. in the range of 1% to 30% of the maximum air flow rate $Q_{AIR1}(t)$ of the dust extractor 500, in a situation where power tool is in the second state STATE2.

In an embodiment, the control system SYS1 may optionally comprise a voltage measuring unit VM1 to measure the voltage $V_1(t)$ of the node N1. The voltage measuring unit VM1 to measure the voltage difference $V_1(t)$ between the nodes N0, N1. The voltage measuring unit VM1 may form a voltage indicator signal $S_{V1}$ indicative of the measured voltage $V_1(t)$. In an embodiment, the control system SYS1 may be arranged to calculate RMS electric power transmitted via the electric outlet SOC1 from the measured current $I_{AM1}(t)$ and from the measured voltage $V_1(t)$. RMS means root mean square.

For the person skilled in the art, it will be clear that modifications and variations of the devices and methods according to the present invention are perceivable. The figures are schematic. The particular embodiments described above with reference to the accompanying drawings are illustrative only and not meant to limit the scope of the invention, which is defined by the appended claims.

The invention claimed is:

1. A dust extractor, comprising:
   a motor and a fan to generate an air flow,
   a dust separator to separate dust particles from the air flow,
   an electric outlet connectable to a power tool,
   a control system,
   a user interface, and
   a current measuring unit to measure electric current of the outlet,
   wherein the control system is arranged to:
   measure a first representative current value of the electric outlet by using the current measuring unit,
   associate the first representative current value with a first state of the power tool when a user confirms by providing a first user input via the user interface that the power tool is operating in the first state,
   determine a first threshold value from the first representative current value associated with the first state of the power tool,
   measure the electric current of the outlet,
   compare the measured electric current with the first threshold value, and
   control an air flow of the dust extractor based on a result of said comparison,
   wherein the control system is arranged to provide a first prompt to the user via the user interface so as to indicate that the control system is ready to receive the first user input.

2. The dust extractor of claim 1, wherein the control system is arranged to:
   determine a first measurement time based on the first user input received via the user interface, and
   measure the first representative current value at the first measurement time.

3. The dust extractor according to claim 1, wherein the control system is arranged to:
   measure a second representative current value of the electric outlet,
   associate the second representative current value with a second state of the power tool based on a second user input received via the user interface,
   determine said first threshold value from the first representative current value and from the second representative current value.

4. The dust extractor according to claim 3, wherein the control system is arranged to:
   determine a second measurement time based on the second user input received via the user interface, and
   measure the second representative current value at the second measurement time.

5. The dust extractor of claim 4, wherein the control system is arranged to provide a second prompt via the user interface so as to indicate that the control system is ready to receive the second user input.

6. The dust extractor according to claim 1, wherein the control system is arranged to:
   start the air flow of the dust extractor when the measured electric current of the electric outlet increases to or exceeds the first threshold value, and/or
   stop the air flow when the electric current falls to or below a second threshold value.

7. The dust extractor of claim 1, wherein the first state of the power tool is an operating state where the motor of the power tool is running without a load during an idling time period.

8. A method for operating a dust extractor, the dust extractor comprising:
   a motor and a fan to generate an air flow,
   a dust separator to separate dust particles from the air flow,
   an electric outlet connected to a power tool, and
   a current measuring unit to measure electric current of the outlet, the method comprising:
   measuring a first representative current value of the electric outlet by using the current measuring unit when the power tool is in a first state,
   associating the first representative current value with the first state of the power tool when a user confirms by providing a first user input via a user interface that the power tool is operating in the first state,
   determining a first threshold value from the first representative current value,
   measuring the electric current of the outlet,
   comparing the measured electric current with the first threshold value, and
   controlling an air flow of the dust extractor based on a result of said comparison,
   wherein the method further comprises providing a first prompt to the user via the user interface so as to indicate that a control system is ready to receive the first user input.

9. The method of claim 8, comprising:
   determining a first measurement time based on the first user input received via the user interface, and
   measuring the first representative current value at the first measurement time.

10. The method according to claim 8, comprising:
    measuring a second representative current value of the electric outlet when the power tool is in a second state,
    associating the second representative current value with the second state based on a second user input received via the user interface,
    determining said first threshold value from the first representative current value and from the second representative current value.

11. The method of claim 10, comprising:
    determining a second measurement time based on the second user input received via the user interface, and
    measuring the second representative current value at the second measurement time.

12. The method of claim 11, comprising providing a second prompt via the user interface so as to indicate that a control system is ready to receive the second user input.

13. The method according to claim 8, comprising:
    starting the air flow of the dust extractor when the measured electric current of the electric outlet increases to or exceeds the first threshold value, and/or stopping the air flow when the electric current falls to or below a second threshold value.

* * * * *